Patented Apr. 30, 1940

2,198,946

UNITED STATES PATENT OFFICE 2,198,946

METHOD OF MANUFACTURING ESTERS

Nicolaus Moskovits, Budapest, Hungary, assignor to Agricultural and Chemical Works Public Company Limited by Shares, Budapest, Hungary No Drawing. Application August 27, 1934, Serial No. 741,734. In Austria March 14, 1934

8 Claims. (Cl. 260—494)

This invention is directed to a method of manufacturing esters directly from acetaldehyde or from aldehydes in general while avoiding the necessity of the particular production of the acid as an independent step.

It is well understood that the technical manufacture of esters involves the use of acid and alcohol under heat and in the presence of water abstracting catalysts. As heretofore practiced, for example, the acetic acid necessary for the production of acetic acid esters was at one time produced by the wood distillation and fermentation industries and more recently from acetaldehyde synthetically developed from carbide, acetylene or ethyl alcohol.

When it is considered that in the finished esters the acetic acid is represented only by its acid radical, it would appear that the independent step of producing the acid from the aldehyde is fundamentally superfluous and unnecessary so far as the acid is intended to be produced for the purpose of the ester production.

Therefore, the present invention is primarily directed to a method of producing the esters directly from the acetaldehyde or from aldehydes in general with complete avoidance of the particular independent production of the acid to be used in the ester production.

It has been heretofore known (Titschenko, Zentralblatt 1906, II, pages 1310–1554) to immediately convert aldehydes into esters. In the process there described, however, the aldehyde is condensed to the ester in the presence of aluminum alcoholate by intra-molecular conversion; thus, according to that method ethyl acetate is obtained from acetaldehyde by a condensation reaction and depends upon the additive combination of two aldehyde molecules, so that there is no evolution of water.

The present method is fundamentally distinguished from that above noted by the fact that in the known method there is required for the production of one ethyl acetate molecule two acetaldehyde molecules, whereas with the present invention the production of one ethyl acetate molecule requires but one acetaldehyde molecule with the utilization of one ethyl alcohol molecule.

Furthermore, the courses of the two reactions in the respective known method and that of the present application are fundamentally different, for in the known method a condensation reaction takes place without evolution of water, whereas in the method according to the present application an esterification takes place with the evolution of water.

In accordance with the method of the present application, it is, as a matter of fact, possible to immediately produce esters from acetaldehyde or other aldehydes with the utilization of an alcohol according to the type of ester to be produced. The fundamental feature of the present process resides in that the mixture of the aldehyde corresponding to the selected acid and of the alcohol corresponding to the type of ester to be produced, is oxidized with oxygen. Thus, for example, a mixture of acetaldehyde and ethyl alcohol subjected in an autoclave to the action of oxygen, or a gas containing oxygen, immediately yields ethyl acetate.

The present process, therefore, consists in that, for the purpose of the immediate production of esters, the acid radical of the desired ester is formed from the correspondingly selected aldehyde and the alcohol radical of the desired ester from the correspondingly selected alcohol, by immediate oxidation, whereby the reaction takes place with the splitting out of water. Therefore, the present process is fundamentally and practically distinguished from the known technical production processes, which latter start with the acid itself.

The practical execution of the present process is considerably facilitated by the assistance of suitable catalysts, though it is recognized that such are not absolutely essential. Among suitable catalysts may be mentioned the metals of variable valency or their compounds, as, for example, manganese salts, uranium salts and the like, particularly in the presence of acids. In the production of ethyl acetate, for example, an effective catalyst may consist of potassium permanganate dissolved in concentrated acetic acid, in which use a small quantity of sulphuric acid can be added to the system.

As indicating specifically examples of the process, reference is had to the following:

For the production of ethyl acetate from acetaldehyde and ethyl alcohol, 1050 ccs. of acetaldehyde are introduced into a vessel of a material stable to acid. A mixture of 1250 ccs. of 95% ethyl alcohol, 220 ccs. of 90% acetic acid, 6 grams of uranyl chloride and 15 grams of concentrated sulphuric acid is slowly added to the acetaldehyde. The vessel is then closed, oxygen introduced in any desired manner and external heat applied. The pressure is initially allowed to rise to about one to two atmospheres above normal atmospheric pressure and the heating is regulated so that the contents of the vessel reach a temperature of from 40 to 50 degrees C. in one-half to one hour. The external heating is then cut off, as the heat of reaction is sufficient for the maintenance of the necessary temperature. The reaction is concluded in about eighteen hours, during which time the pressure is progressively increased to about five to six atmospheres above atmospheric pressure. When the reaction has been completed, the supply of oxygen is interrupted and the system cooled below 20 degrees C., the pressure is released and the reaction products separated by distillation. The acetaldehyde employed is converted to the extent of 91.5% into ethyl acetate while 6% remains unchanged, the balance being distillation loss.

In the manufacture of propyl benzoate and benzoic acid, benzaldehyde is mixed with half the equivalent quantity of propyl alcohol, 2% of hydrochloric acid and 0.4% of manganese chloride added to the mixture, which mixture is oxidized and subjected to the treatment defined in the previous example. In the reaction production about 10 to 12% of benzaldehyde and a portion of the propyl alcohol remain unchanged while about 88 to 90% of the benzaldehyde is converted into propyl benzoate and benzoic acid.

In the manufacture of isoamyl acetate and sodium acetate, acetaldehyde is mixed with half the equivalent quantity of isoamyl alcohol, to which mixture there is added 2% of concentrated sulphuric acid, 0.7% of potassium permanganate dissolved in concentrated acetic acid and the mixture oxidized in accordance with the treatment described in connection with the first example for about twenty hours. The reaction product is neutralized with sodium carbonate and treated with a sufficient quantity of water to cause the amyl acetate to distill over in the form of a binary mixture with water. 7% of the acetaldehyde employed remains unchanged, 45% is converted into ester and the residue consists of sodium acetate containing manganese with an acetic acid content of 46% of the aldehyde employed.

It is to be understood that the process is limited in no way to the examples given but may be varied within wide limits. For example, with the use of mixed aldehydes and an alcohol or an aldehyde and mixed alcohols, or mixed aldehydes and mixed alcohols, any desired ester mixtures can be produced, and it is contemplated that for the particular desired ester, the invention contemplates the use of a particular aldehyde and a particular alcohol known to be capable of producing the desired ester.

Furthermore, the process has another and important feature, namely, that not only can the desired ester be produced in any quantity but it is also possible to produce as a result of the same process a particular acid. This is accomplished by reducing the quantity of the particular alcohol introduced into the reaction system, with the result that not only is the ester produced but there is also produced a quantity of acid at the same time substantially commensurate with the proportion of alcohol eliminated from the mixture.

The process is economical and time and labor saving in that the ester, and if desired the acid, is produced immediately from the aldehyde, these without the necessity of the preliminary step of the production of the acid as a prelude to the production of the ester.

What is claimed to be new is:

1. A process for the manufacture of esters, consisting in causing a gas which contains free oxygen to react under superatmospheric pressure on a mixture of an aldehyde belonging to the group which comprises saturated aliphatic aldehydes and aromatic aldehydes containing no unsaturated side chains, and an alcohol selected in accordance with the acid and alcohol radicals to be contained in the desired ester.

2. A process as defined in claim 1, wherein a member of the group consisting of uranyl chloride, manganese chloride and potassium permanganate is added as a catalyst.

3. A process as defined in claim 1, wherein there is added as a catalyst a member of the group consisting of uranyl chloride, manganese chloride and potassium permanganate, with added mineral acid.

4. A process for the manufacture of mixed esters, consisting in causing a gas which contains free oxygen to react under superatmospheric pressure on a mixture of aldehydes belonging to the group which comprises saturated aliphatic aldehydes and aromatic aldehydes containing no unsaturated side chains, and an alcohol.

5. A process for the manufacture of mixed esters, consisting in causing a gas which contains free oxygen to react under superatmospheric pressure on an aldehyde belonging to the group which comprises saturated aliphatic aldehydes and aromatic aldehydes containing no unsaturated side chains, and a mixture of alcohols.

6. A process for the manufacture of mixed esters, consisting in causing a gas which contains free oxygen to react under superatmospheric pressure on a mixture of aldehydes belonging to the group which comprises saturated aliphatic aldehydes and aromatic aldehydes containing no unsaturated side chains, and a mixture of alcohols.

7. A process as defined in claim 1, wherein the mixture is subjected to a temperature above 20° C.

8. A process as defined in claim 1, comprising, in addition to that of the ester, the production of the acid corresponding to the acid radical of the ester from the correspondingly selected aldehyde by introducing intro the reaction system only a part of that quantity of alcohol which would be equivalent to the quantity of aldehyde present, whereby any aldehyde not consumed in the formation of the ester will convert into said acid.

NICOLAUS MOSKOVITS.